US008014528B2

(12) United States Patent
Bunte et al.

(10) Patent No.: US 8,014,528 B2
(45) **Date of Patent: *Sep. 6, 2011**

(54) METHOD FOR ACCESSING A USER OPERABLE DEVICE OF CONTROLLED ACCESS

(75) Inventors: Björn Bunte, Bochum (DE); Holger Krummel, Bochum (DE); Tilman Bollmann, Essen (DE)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/288,967

(22) Filed: Oct. 23, 2008

(65) Prior Publication Data

US 2009/0074193 A1 Mar. 19, 2009

Related U.S. Application Data

(63) Continuation of application No. 10/186,223, filed on Jun. 26, 2002, now Pat. No. 7,457,418.

(30) Foreign Application Priority Data

Jun. 27, 2001 (EP) .................................... 01115474

(51) Int. Cl.
*H04L 9/00* (2006.01)

(52) U.S. Cl. ........ 380/278; 380/277; 380/270; 713/168; 713/155; 455/410

(58) Field of Classification Search ........................ None
See application file for complete search history.

(56) References Cited

U.S. PATENT DOCUMENTS

| | | | | |
|---|---|---|---|---|
| 5,371,794 | A | 12/1994 | Diffie et al. | 713/156 |
| 5,705,991 | A | 1/1998 | Kniffin et al. | 340/5.28 |
| 6,175,922 | B1 | 1/2001 | Wang | 713/182 |
| 6,226,744 | B1 | 5/2001 | Murphy et al. | 726/5 |
| 6,363,417 | B1 | 3/2002 | Howard et al. | 709/217 |
| 6,886,095 | B1 | 4/2005 | Hind et al. | 713/168 |
| 6,895,234 | B1 | 5/2005 | Laursen et al. | 455/403 |
| 2001/0047426 | A1 | 11/2001 | Hunter | 709/238 |
| 2002/0026574 | A1 | 2/2002 | Watanabe et al. | 713/155 |
| 2002/0077856 | A1* | 6/2002 | Pawlikowski et al. | 705/2 |
| 2002/0153994 | A1* | 10/2002 | Bonner et al. | 340/5.21 |
| 2002/0157002 | A1 | 10/2002 | Messerges et al. | 713/155 |
| 2002/0178385 | A1 | 11/2002 | Dent et al. | 713/202 |
| 2002/0191795 | A1 | 12/2002 | Wills | 380/270 |
| 2003/0112977 | A1 | 6/2003 | Ray et al. | 380/270 |
| 2003/0208386 | A1 | 11/2003 | Brondrup | 705/5 |

FOREIGN PATENT DOCUMENTS

| | | |
|---|---|---|
| EP | 0 410 024 | 1/1991 |

(Continued)

*Primary Examiner* — Nasser Moazzami
*Assistant Examiner* — Fikremariam Yalew

(57) ABSTRACT

A method is provided for accessing a user operable device having limited access ability. The method comprises transmitting an inquiry from a mobile device of a user via a wide area transmission network to a key authority for obtaining an access key for accessing functions of the user operable device, receiving a request for information from the key authority, transmitting the requested information to the key authority, wherein the information is used by the key authority for co-coding the access key with one or more conditions for operating the user operable device, receiving the access key assigned by the key authority via the wide area transmission network, and transmitting the access key to a controller unit of the user operable device via a short range communication network for accessing the functions of the user operable device.

35 Claims, 3 Drawing Sheets

FOREIGN PATENT DOCUMENTS

| | | | | |
|---|---|---|---|---|
| WO | WO 98/25000 | | | 6/1998 |
| WO | WO 01/40605 | | | 6/2001 |
| WO | WO 01 40605 | A | * | 6/2001 |
| WO | WO 0140605 | A | * | 6/2001 |
| WO | WO 01/63425 | | | 8/2001 |

* cited by examiner

METHOD FOR ACCESSING A USER OPERABLE DEVICE OF CONTROLLED ACCESS

CROSS REFERENCE TO RELATED APPLICATIONS

This application is a continuation of application Ser. No. 10/186,223, filed on Jun. 26, 2002 now U.S. Pat. No. 7,457,418, which claims priority to European patent application No. 01115474.7-2221, filed on Jun. 27, 2001. The aforementioned patent applications are incorporated by reference in their entirety.

BACKGROUND OF THE INVENTION

1. Technical Field

The present invention relates to a method for accessing a user operable device of controlled access. In particular, the invention relates to a method for accessing a user operable device of controlled access secured by an electronic key which can be assigned by radio link.

2. Discussion of Related Art

Traditionally, the access to several devices, particularly devices which can be rented, is often limited by time restraints due to the fact that for example a real key must be handed over to the user who intends to rent this device. Therefore, local agencies have to be maintained, which are cost-intensive. To operate such services from a central office without local agencies it is necessary to organize the rental process without handing over physical objects such as a real key.

DISCLOSURE OF INVENTION

The object of the present invention is to provide a method for accessing a user operable device having a limited accessibility by a user.

A further object of the present invention is to provide a mobile device used to request access to the user operable device granted by a key authority for permitting access and used to transmit the permission of access to a controller unit controlling the access to the user operable device.

A further object of the present invention is to provide a controller unit in order to control the access to the user operable device of limited access.

In accordance with the present invention there is provided a method for accessing a user operable device of a limited accessibility by a user comprising transmitting an inquiry from a mobile device of said user to a key authority via a wide area transmission network in order to obtain an access key for accessing functions of a controller unit of said user operable device, verifying said inquiry by said key authority, assigning said access key by said key authority, transmitting said access key via a wide area transmission network to said mobile device, storing said access key in said mobile device, transmitting said access key form said mobile device to said controller unit via a local area transmission network, validating said access key and granting access to said user operable device.

The solution of the object is attained by the possibility of using an electronic key to operate devices. Thus, granting access to these devices can be done without any physical contact. Therefore, the presented method comprises an inquiry step in which the user defines the device desired to operate on and the conditions under which the device shall be operated via a wide area transmission network using a mobile device. A key authority verifies this inquiry. When permission of usage can be given to the user an access key is transmitted via a wide area transmission network to the mobile device. The mobile device has the possibility to store this access key for later usage. When desired by the user the access key is transmitted via a local area transmission network to a controller unit controlling the user operable device which was determined by the user's inquiry. The controller unit validates the access key and grants access to the user operable device.

Preferably, the method comprises the transmission of information back concerning the validity of the access key via the local area transmission network to the mobile device of the user in order to inform the user about the granting process and conditions including for example a confirmation of validity, a validity time of the access key and a number of possible accesses. Additionally, the transmission back can also include information concerning the operable functions which are accessible by the user. This is an important information since not all devices controlled by the controller unit need to be user operable.

Conveniently, the inquiry of the method according to the present invention can include several transmissions and retransmissions of additional data. For example, additional data including offers made by key authority according to a first inquiry of the user, a selection of offers by the user and also information about the conditions under which assigning of the access key is possible. If the user desires to use a kind of device without defining the exact type, the key authority is able to transmit an information about several operable devices according to the type defined by the user's inquiry. For example, if the user desires to rent a car, the car rental agency can offer him different cars and additionally different built-in equipment like a mobile phone. The user selects an offer transmitted to the key authority which relates to the car rental in this case.

Preferably, the user transmits a desired period of time value defining the period of validity of the access key. In case of the car rental examples, usually the user defines the number of days for using the car.

An embodiment includes transmitting and verifying identification data of the user.

Additionally, payment information are also transmitted and verified. Payment information can be credit card information or bank account information.

Conveniently, the key authority is a service provider. Additionally, the key authority is a call center. Preferably, the key authority is a WEB server accessed via a WEB page or the key authority is a WAP server accessed via a WAP page.

A controller unit can control the access to several functions of the user operable device. Due to this it is necessary to provide selective access to single user operable functions of the device which can be performed using different access keys for the different user operable functions. Additionally, the user operable functions are sorted in a hierarchical structure. The position in the hierarchical structure can be obtained and defined by the kind of function, the importance, the access security level and the like of the operable device. According to the hierarchical structure of the operable devices it is possible to define a corresponding access key structure. This means that a level is assigned to each access key and an access key of a certain level includes the accessibility to all user operable devices of corresponding access keys with lower key levels. This kind of access can be interesting for maintenance of devices. Therefore, access keys can be provided for example by the manufacturer or any other service provider offering maintenance services.

A possible implementation of a hierarchical access key structure is providing keys for towing service. In case of a breakdown of a car the owner has to call the towing service and has to wait until the car is brought for example to a parking area of a garage. A lot of time gets lost. In order to shorten the time spent by the user for the towing process it is possible according to the method of the present invention to submit an access key to the towing service enabling to open the car, switch on electrical devices like lights, flash lights and the electrical system of the car but not to start the engine of the car, use the built-in devices like mobile phone or open the boot of the car. The submitted access key shall only allow the towing service provider to tow the car to a garage and therefor needed functions of the car are allowed to use. Later an other access key of an higher level can be provided by the owner to the garage to make it possible for the mechanics to use the same functions like the towing service and additionally to operate on the electrical system of the car like reading out management data, status data, error messages of the engine or programming the management system. Even the higher level access key provided to the garage must not allow the usage of built-in devices like a mobile phone.

The different access key need not be provided by the owner of the car himself. It is possible that the owner of the car uses the service of a key authority providing the different access key to the towing service or the garage according to the method of the present invention.

Another implementation of a hierarchical access key structure is providing key for access to terminals. Computer access is a typical system using access keys of a hierarchical structure. A local terminal is equipped with a Bluetooth receiver. To gain access to the terminal an access key according to the method of the present invention is transmitted to the receiver logging on the user of the mobile device. According to the permission of the user different access levels of the computer terminal are granted to the user.

Preferably, a device identification of the user operable device is co-coded in the access key to provide the access to a defined device. Additionally, a period of validity of a total access period is co-coded. To increase the security of the access process a period of validity of a first access can conveniently be also co-coded. And the possibility of co-coding the number of access procedures is also provided.

Additionally, validating of the access key by the controller unit can be performed by comparing with a validation key generated by the controller unit. The generation of a key comprises several additional parameters according to the fact that the access key can include co-coded information such as period of validity, number of accesses. These additional parameters have to be provided to the generation process.

Preferably, instead of comparing the access key with a generated key a reference key can be used which is transmitted to the controller unit via an interface. The usage of a reference key for the validation step is more reliable since a generation method of a key can be revealed or discovered and therefore the key authority can be bypassed. Conveniently, the reference key is stored in the controller unit.

To use a stored key to compare with the access key is a further preferable method to validate the access key. Particularly, the latter method is useful when keys for maintenance access shall be provided. It is obviously possible to delete stored keys in order to prevent further usage of a certain access key.

The possibility of transmitting a key to be stored in the controller unit for example offers the opportunity to an owner of a car to provide an access key to a second person for using his car. In this case the owner of the car is the key authority who receives the inquiry, verifies the information provided by the inquiry step and transmits the access key to grant access to his car to a second person.

Additionally, the reference key transmitted via the interface unit or a stored key need not to be used directly in the validating step. It is also possible to use the reference key or the stored key as part of the data used for generating the validating key.

In order to prevent misappropriation and misuse of the access key all transmission steps are secured by using encrypted transmission. Additionally, encrypted transmission used for the inquiry step can also enhance the security of the method particularly when user identification or payment data are transmitted.

Preferably, the local area transmission network is a low power radio frequency network. Conveniently, the local area transmission network may be a radio frequency network according to e.g. the Bluetooth standard. Alternatively, the local area transmission network may be an infrared transmission network.

Preferably, the wide area transmission network is a network for mobile transmission and communication such as GSM, UMTS or the like. Conveniently, the wide area transmission network is a cellular network for mobile communication. Specifically, the wide area transmission network is a mobile data transmission and communication network according to the GSM standard. More specifically, the wide area transmission network is a mobile data transmission and communication network according to the WCDMA standard. Most preferably, the wide area transmission network is a mobile data transmission and communication network according to UTMS standard.

Additionally, the access key is transmitted via a message according to e.g. the SMS standard included in the GSM standard.

The present invention further comprises a mobile device according to the above-discussed method. This mobile device comprises the following means in order to fulfil the demands defined by the method of the present invention: a unit for inputting inquiry data to be transmitted to the key authority, a unit for transmitting the inquiry data via the wide area transmission network, a unit for receiving the access key, a unit for storing the access key and a unit for transmitting the access key to the controller unit.

According to the above explained method the mobile device can additionally comprise a unit for receiving information concerning the validity of the access key or the operable functions which are accessible by the user.

Preferably, to secure the access granted to the user by the key authority, a re-coding of the access key is performed using information or data only accessible by the mobile device or the user thereof, wherein the data can be a PIN code only known by the user or a unique built-in mobile device identification.

Conveniently, a WEB client or a WAP client can be included in the mobile device.

The present invention further comprises a controller unit for usage in a method according to any one of the preceding claims and connectable to a user operable device comprising a unit for receiving an access key via a local area transmission network, a unit for storing the access key, a unit for validating the access key and means for controlling functions of the user operable device.

According to the above-described method the controller unit can additionally comprise a unit for generating a validation key. Preferably, the controller unit comprises a unit for storing a key or several keys.

Conveniently, the controller unit comprises a unit for retransmitting information concerning the validity of the access key or the operable functions, which are accessible by the user.

Preferably, the controller unit comprises an interface unit. This interface unit can be connected to an authorized device or an authorized instant. The connecting of the interface unit to an authorized device can be done using a common communication standard based on methods using wire for communication or wireless communication. More preferably, the interface unit uses a wide area communication network such as defined above. Additionally, the interface unit can also use a local area communication network defined above.

When using co-coded access keys additional units may be necessary to gain the additional data for generating the according validation key or for validating the co-coded information of the access key. These units could be units providing a clock signal for checking a period of time, device identification, for example the type of a unique number, a position signal e.g. a GPS signal or signals generated by the user operable device like notifying failure, misoperation or maintenance requirement.

The method according to the present invention provides a secure method to offer and to control access to user operable devices using an electronic key. The electronic key is provided by a key authority. In order to get a granted access to a desired user operable device an inquiry has to be transmitted by the user to the key authority including all necessary data and information. The electronic key is transmitted to a mobile device of the user used before to transmit the inquiry. The electronic key allows the user to get access to the user operable device which is controlled by a controller unit.

BRIEF DESCRIPTION OF THE DRAWINGS

The present invention is described with respect to particular exemplary embodiments thereof and reference is accordingly made to the drawings in which.

BEST MODE FOR CARRYING OUT THE INVENTION

Figure 1:
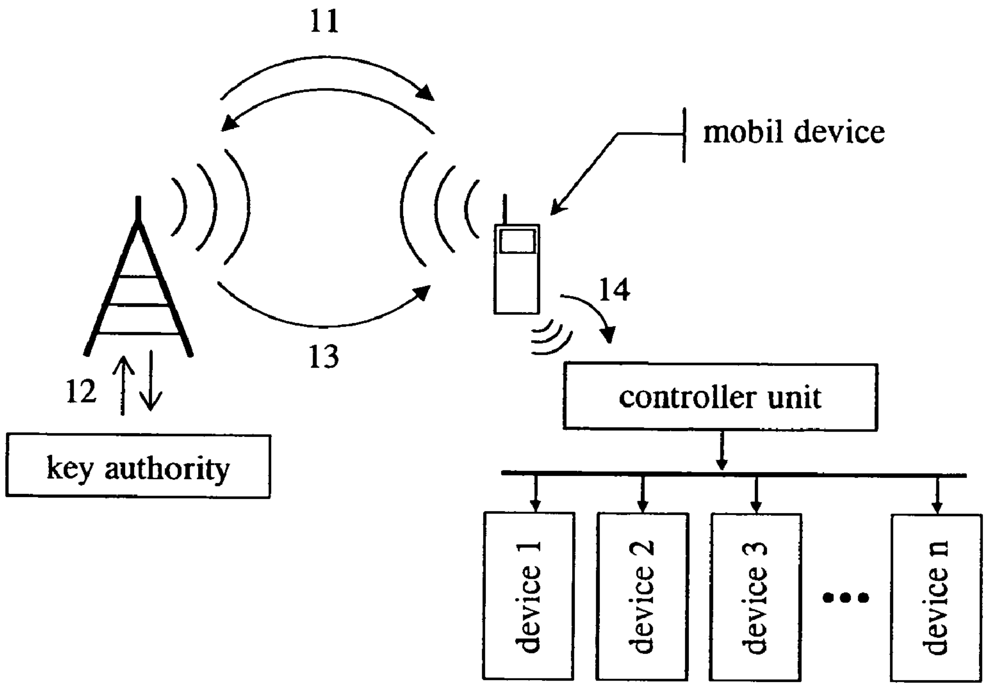
FIG. 1 illustrates schematically the sequence of information transmitted according to the method of the present invention.

FIG. 1 illustrates schematically the sequence of information transmitted according to the method of the present invention as well as devices and units involved and visible to the user. The first step of the method referenced as inquiry 11 comprises at least one inquiry to operate a certain device 1,2,3 or n. Commonly, the inquiry includes several transmissions and retransmission 11, 12. The key authority 12 is accessed via a wide area transmission network, particularly a GSM cellular network. Information about the user identification and payment data have to be verified. A positive verification leads to the transmission 13 of the access key of the user operable device to the mobile device which is stored in said mobile device. The access key stored in the mobile device and information about the user operable device transmitted from the key authority enables the user to identify the assigned user operable device. The transmission 14 of the access key to the controller unit via a local area transmission network, like Bluetooth, allows the user to operate on a single or several devices controlled by the controller unit under the conditions co-coded in the access key.

Figure 2:
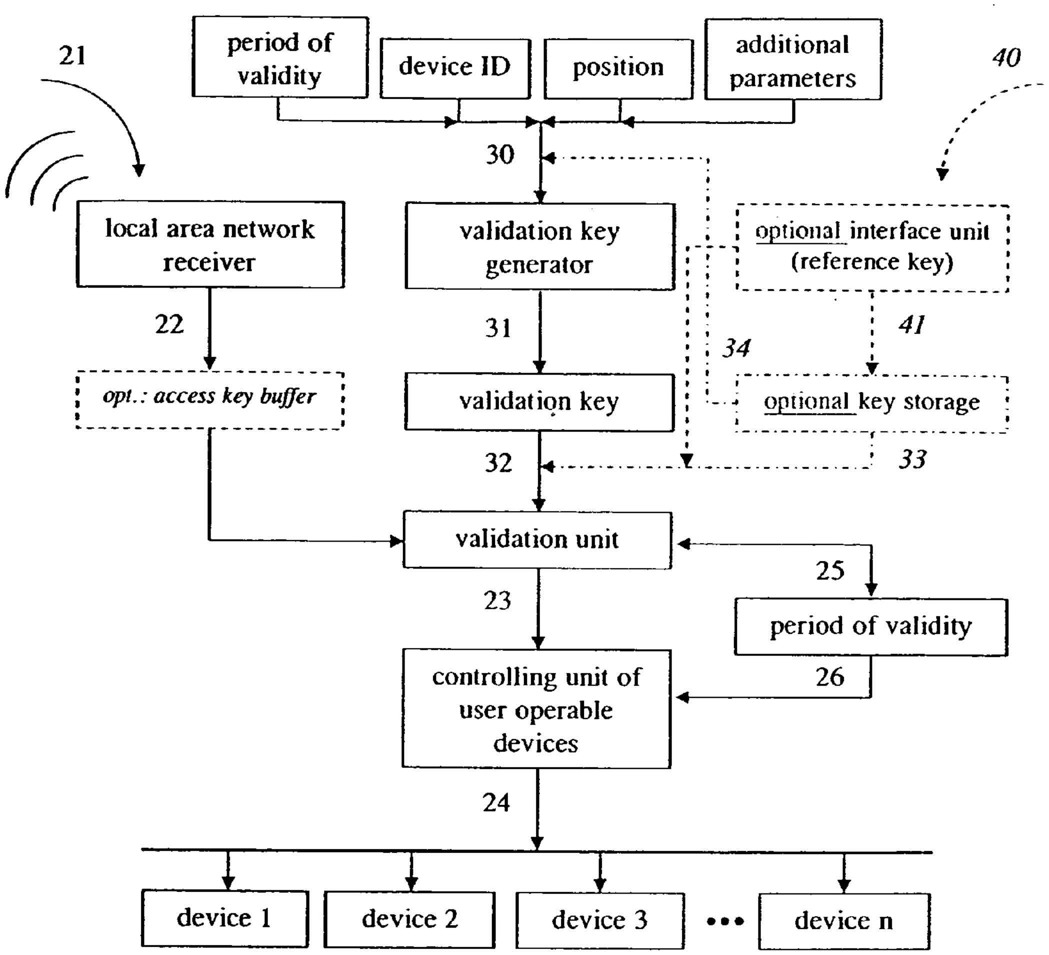
FIG. 2 shows a set of possible units included in a preferable embodiment of the controller unit.

FIG. 2 shows a set of possible units included in a preferred embodiment of the controller unit. Validating of the access key comprises several steps and can be carried out in different ways. Following reference numbers 21 to 24, shown in FIG. 2, the access key is transmitted 21 from the mobile device via a local area transmission network to a receiver unit of the controller unit. If necessary, the access key can be stored in an access key buffer or passed directly 22 to the validation unit. The access key is validated thereon. A positive validation is passed 23 to a controlling unit responsible for controlling the user operable devices. The user operable devices are controlled via a controlling bus 24.

A co-coded period of validity in the access key has to be extracted 25 and monitored 26. When the period is run out the permission of usage expires and the user operable devices are no longer accessible.

There are different ways conceivable to validate the access key. The embodiment according to FIG. 2 shall describe different ways without limiting the validation process illustrated by using different line styles.

The validation of the access key is often done by comparing the transmitted access key with a validation key generated within the controller unit (follow reference numbers 30 to 32 shown in FIG. 2). To generate the validation key parameters like at least the device identification data have to be passed 30 to the validation key generator. The generated validation key is finally passed 23 to the validation unit.

Alternatively, a validation key can also passed 33 from a permanent or programmable key storage to the validation unit. Preferably, the key storage comprises a storage of data used 34 as additional parameters for the key generation. Additionally, an interface can provide access to the validating unit by providing a reference key in order to be compared with the access key. This reference key can also be stored 41 in the key storage or be used as parameter in the key generation comparable to a stored key. Such an access to the interface has to be controlled strictly since keys used in the validation step can be transmitted to the controller unit in order to overcome the key authority. However, if the interface is connected to a transmission network 40 providing access to the key authority the key authority is able not only to transmit the access key to the user but also the corresponding reference key or part of the key to be generated in order to enhance the security of the method. Due to the additional transmission of data to the controller unit users are not able to pass the key generation since they lack important data.

Figure 3:
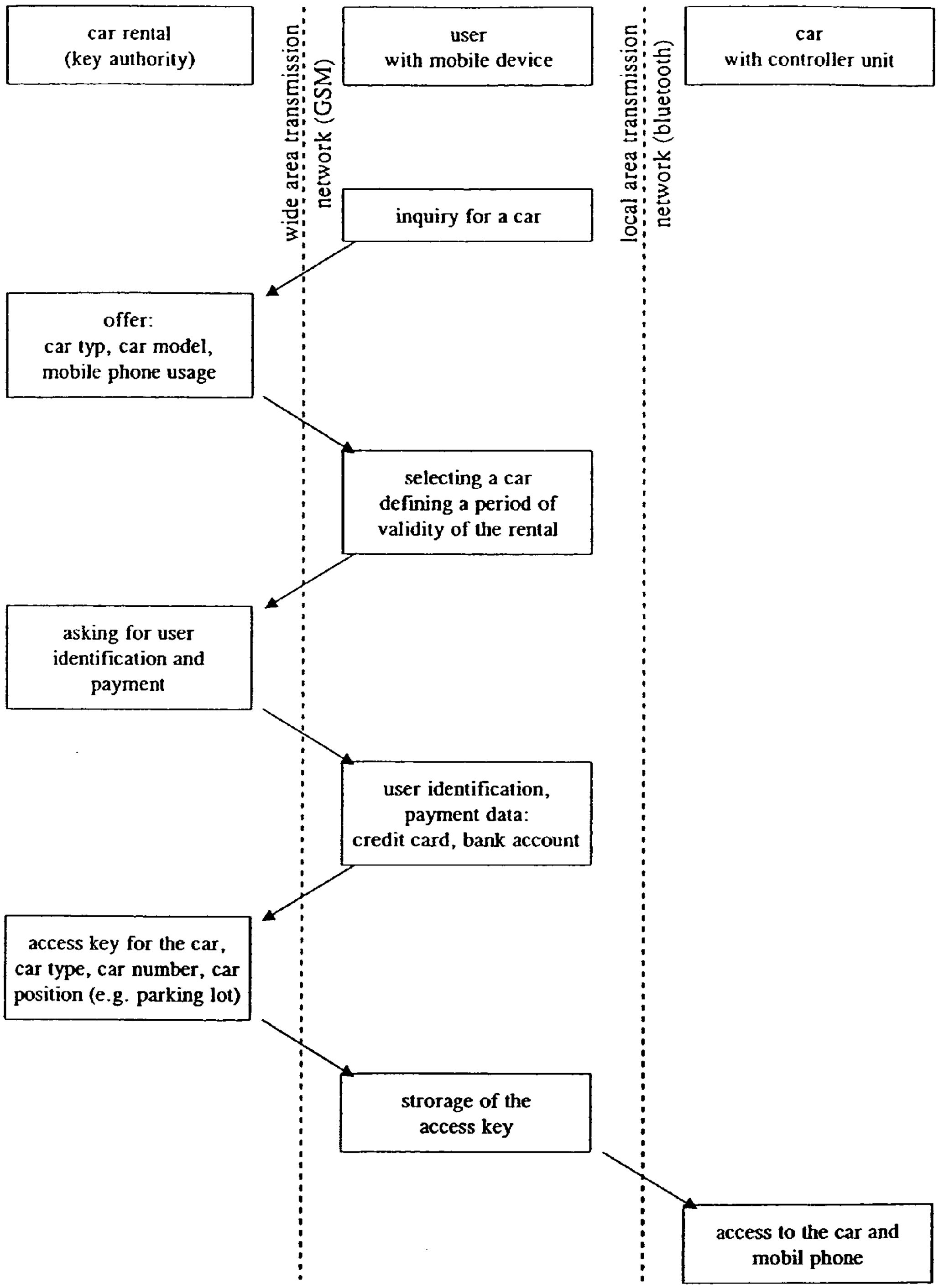
FIG. 3 illustrates the method of the present invention taking a procedure of a rental of a car as example.

FIG. 3 shows a possible course of a car rental process using the method according to the present invention. In a first step the users sends a first transmission for inquiry of a car to a car rental. The car rental responds to the request of the user offering several possible cars of different type, model and equipment. The user selects a car and desired additional equipment, defines the period of validity and transmits this information to the car rental. Subsequently the car rental transmits a request to the user to send an identification and information concerning the payment. This request has also to be answered by transmitting an identification number of the passport and credit card data to the car rental. All these data have to be verified by the key authority before an access key can be granted to the user. A positive verification of the information given by the user leads to a transmission of an access key and additional information about the car like car number and parking lot number. The access key is stored in the mobile device. When the user wishes to get access to the car, he transmits the stored access key to the car. The access key can also enable the access to additional equipment of the car like a built-in mobile phone.

The invention claimed is:

1. A method, comprising:

transmitting an inquiry from a mobile device of a user via a wide area transmission network to a key authority for obtaining an access key for accessing functions of a user operable device having limited accessibility;

receiving a request for information from the key authority;

transmitting the requested information to the key authority, wherein the information is used by the key authority for co-coding the access key with one or more conditions for operating the user operable device;

receiving the access key assigned by the key authority via the wide area transmission network;

storing the access key; and transmitting the access key to a controller unit of the user operable device via a short range communication network for accessing the functions of the user operable device;

wherein a validation key is generated by the controller unit for comparing with the access key, and if the access key is validated, the access to the functions of the user operable device is granted according to the conditions co-coded in the access key.

2. The method of claim 1, further comprising receiving from the controller unit information concerning operable functions accessible by the user via the short range communication network.

3. The method of claim 1, wherein the requested information includes identification and payment information of the user.

4. The method of claim 1, wherein transmitting the inquiry to the key authority includes transmitting a desired period of time value defining the period of validity of the access key.

5. A method, comprising:

receiving an access key in a controller via a short range communication network from a mobile device of a user, the access key being issued by a key authority and co-coded with one or more conditions for operating a user operable device having limited accessibility;

generating a validation key in said controller;

comparing the validation key with the access key; and if the access key is valid, granting access to the functions of the user operable device according to the one or more conditions co-coded in the access key.

6. The method of claim 5, further comprising:

transmitting information concerning the validity of the access key via the short range communication network to the mobile device.

7. The method of claim 5, further comprising:

transmitting information concerning operable functions accessible by the user via the short range communication network to the mobile device.

8. The method of claim 5, wherein the validation key is generated based on device identification data of the user operable device.

9. The method of claim 5, wherein the validation key is generated based on time information.

10. The method of claim 5, wherein the validation key is generated based on a period of validity.

11. The method of claim 5, further comprising:

receiving a reference key from the key authority via a wide area transmission network, wherein the reference key is part of a data used for generating the validation key.

12. The method of claim 1, wherein the access key is further co-coded with additional information comprising information to enable a user to identify the user operable device to which access is granted.

13. A controller, comprising:

a receiver, configured to receive an access key via a short range communication network from a mobile device of a user, the access key being issued by a key authority and co-coded with one or more conditions for operating a user operable device having limited accessibility, a key generator, configured to generate a validation key, a validation unit, configured to validate the access key by comparing the access key with the validation key, and a controlling unit, configured to provide access to the functions of the user operable device according to one or more conditions co-coded in the access key, if the access key is valid.

14. The controller of claim 13, further comprising:

a transmitter, configured to transmit to the mobile device via the short range communication network information concerning the validity of the access key and/or information concerning operable functions accessible by the user.

15. The controller of claim 13, wherein the receiver is further configured to receive a reference key from the key authority via a wide area transmission network, wherein the reference key is part of a data used for generating the validation key.

16. A mobile device comprising: a transmitter configured to transmit an inquiry from said mobile device via a wide area transmission network to a key authority for obtaining an access key for accessing functions of a user operable device having limited accessibility; a receiver configured to receive a request for information from the key authority; said transmitter further configured to transmit the requested information to the key authority, wherein the information is used by the key authority for co-coding the access key with one or more conditions for operating the user operable device; said receiver configured to receive the access key assigned by the key authority via the wide area transmission network; a storage unit configured to store the access key; and said transmitter configured to transmit via a short range communication network the access key to a controller unit for comparing with a validation key generated by the controller unit, and if the access key is validated, the access key to the functions of the user operable device is granted according to the conditions co-coded in the access key.

17. The mobile device of claim 16, wherein the access key is co-coded with additional information comprising information to enable a user to identify the user operable device to which access is granted.

18. The mobile device of claim 16, wherein the access key is co-coded with additional information comprising a period of validity of the access right.

19. A method, comprising: receiving, from a mobile device of a user via a wide area transmission network, an inquiry for an access key for access key for accessing functions of a user operable device having limited accessibility; transmitting a request information of the user to the mobile device via the wide area transmission network; receiving the requested information of the user from the mobile device; generating the access key, the access key being co-coded with one or more conditions for operating the user operable device based on the received information of the user; transmitting the access key to the mobile device via the wide area transmission network for transmission to a controller unit of the user operable device via a short range communication network for accessing the functions of the user operable device; wherein a validation key is generated by the controller unit for comparing with the access key, and if the access key is validated, the access to the functions of the user operable device is granted according to the conditions co-coded in the access key.

20. The method of claim 19, wherein the information of the user includes identification and payment information of the user.

21. The method of claim 19, wherein the inquiry includes a desired period of time value defining a period of validity of the access key.

22. The method of claim 19, wherein generating the access key comprising generating different access keys for accessing different functions of the user operable device.

23. The method of claim 22, wherein the different access keys are sorted hierarchically according to hierarchically sorted functions of the user operable device.

24. The method of claim 19, wherein the access key is further co-coded with additional information comprising information to enable a user to identify the user operable device to which access is granted.

25. The method of claim 19, wherein a period of validity of a total access period is co-coded in the access key.

26. The method of claim 19, wherein a period of validity of a first access period is co-coded in the access key.

27. The method of claim 19, wherein a number of access procedures is co-coded in the access key.

28. The method of claim 18, further comprising:

transmitting a reference key to a controller unit controlling the user operable device via the wide area transmission network, wherein the reference key is part of a data used by the controller unit for generating a validation key.

29. A key authority for communicating with a mobile device of a user via a wide area transmission network, wherein the key authority is configured to: transmit a request information of the user to the mobile device; receive the requested information of the user from the mobile device; generating the access key, the access key being co-coded with one or more conditions for operating the user operable device based on the received information of the user; transmit the access key to the mobile device via the wide area transmission network for transmission to a controller unit of the user operable device via a short range communication network for accessing the functions of the user operable device; wherein a validation key is generated by the controller unit for comparing with the access key, and if the access key is validated, the access to the functions of the user operable device is granted according to the conditions co-coded in the access key.

30. The key authority of claim 29, wherein the key authority is configured to:

transmit a reference key to a controller unit controlling the user operable device via the wide area transmission network, wherein the reference key is part of a data used by the controller unit for generating a validation key.

31. The key authority of claim 29, wherein the key authority is a service provider.

32. The key authority of claim 29, wherein said key authority is a call center operable manually or automatically by a voice assistant.

33. The key authority of claim 29, wherein the access key is co-coded with additional information comprising information to enable a user to identify the user operable device to which access is granted.

34. The key authority of claim 29, wherein the access key is co-coded with additional information comprising a period of validity of the access right.

35. A key authority comprising:

means for receiving from the mobile device an inquiry for an access key for accessing functions of a user operable device having limited accessibility;

means for transmitting a request for information of the user to the mobile device;

means for receiving the requested information of the user from the mobile device;

means for generating the access key, the access key being co-coded with one or more conditions for operating the user operable device based on the received information of the user; and means for transmitting the access key to the mobile device via the wide area transmission network for transmission to a controller unit of the user operable device via a short range communication network for accessing the functions of the user operable device;

wherein a validation key is generated by the controller unit for comparing with the access key, and if the access key is validated, the access to the functions of the user operable device is granted according to the conditions co-coded in the access key.

* * * * *

UNITED STATES PATENT AND TRADEMARK OFFICE

CERTIFICATE OF CORRECTION

PATENT NO. : 8,014,528 B2
APPLICATION NO. : 12/288967
DATED : September 6, 2011
INVENTOR(S) : Bjorn Bunte, Holger Krummel and Tilman Bollmann It is certified that error appears in the above-identified patent and that said Letters Patent is hereby corrected as shown below:

At column 9, line 29 (claim 28, line 1), "18" should be --19--.

At column 10, line 36 (claim 35, line 14), after "network", insert --communicating with a mobile device of a user via a wide area transmission network--.

Signed and Sealed this
Fifteenth Day of May, 2012

David J. Kappos
*Director of the United States Patent and Trademark Office*